UNITED STATES PATENT OFFICE.

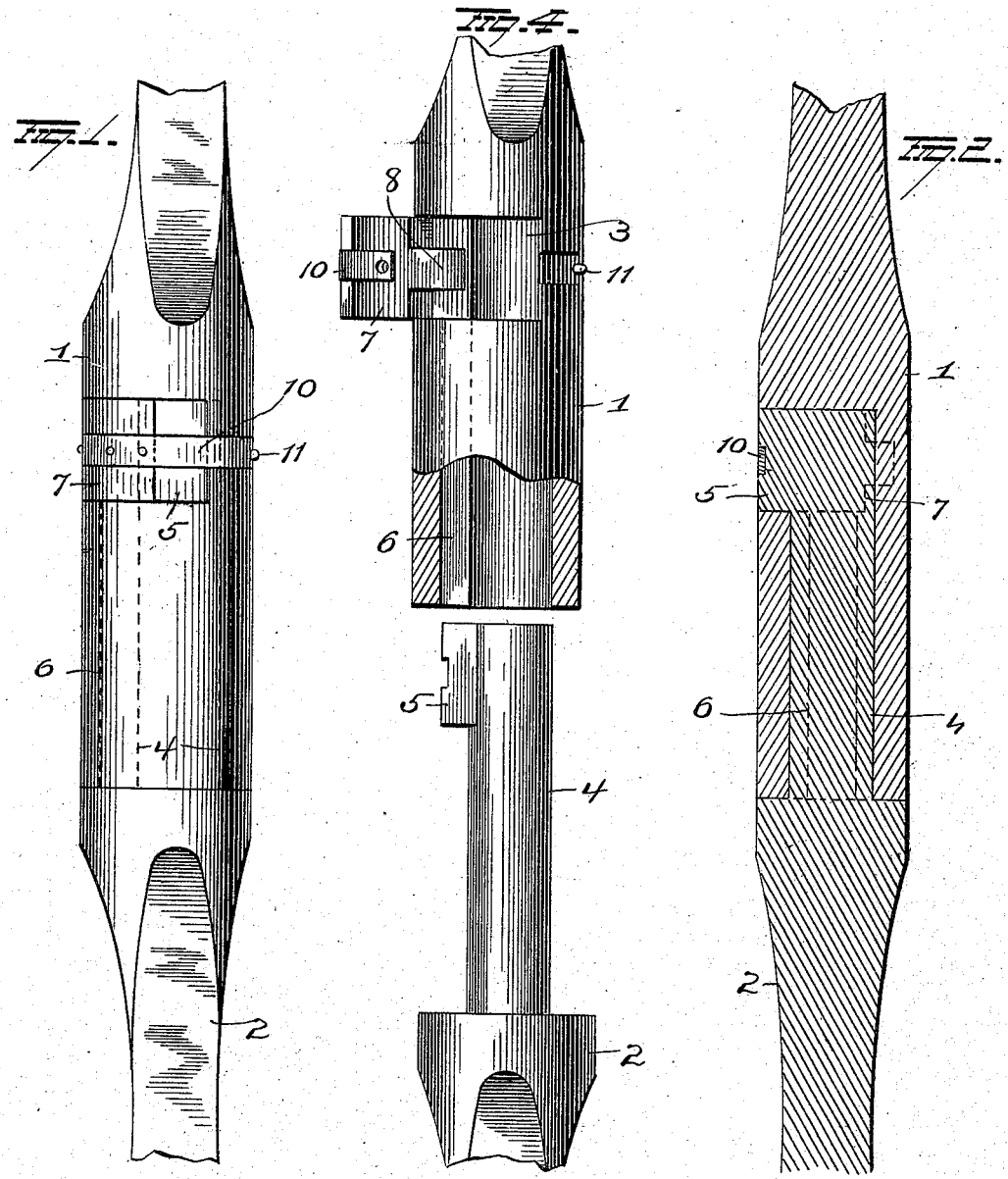

CHARLIE A. ANDERSON, OF CORNPLANTER, PENNSYLVANIA.

ROD-COUPLING.

No. 840,734.

Specification of Letters Patent.

Patented Jan. 8, 1907.

Application filed March 2, 1906. Serial No. 303,933.

*To all whom it may concern:*

Be it known that I, CHARLIE A. ANDERSON, a resident of Cornplanter, in the county of Warren and State of Pennsylvania, have invented certain new and useful Improvements in Rod-Couplings; and I do hereby declare the following to be a full, clear, and exact description of the invention, such as will enable others skilled in the art to which it appertains to make and use the same.

My invention relates to improvements in rod-couplings, and more particularly to an improved coupling for sucker-rods, pump-rods, and the like, the object of the invention being to provide an improved coupling which will permit the rods to be readily and quickly secured together and which will firmly secure them when once coupled; and the invention consists in certain novel features of construction and combinations and arrangements of parts, as will be more fully hereinafter described, and pointed out in the claims.

In the accompanying drawings, Figure 1 is a view in elevation, illustrating my improvements. Fig. 2 is a view in longitudinal section. Fig. 3 is a view in cross-section, and Figs. 4 and 5 are views of the parts separated.

1 and 2 represent the two rods which constitute the two members of the coupling. Member 1 is made with a cylindrical bore from its end to a recess 3, and member 2 is made with a pin 4 to enter the bore of member 1. The pin 4 is provided at its end with a key 5, movable through a keyway 6 in member 1, which communicates with the bore of member 1 and also with the recess 3 in said member. When the key 5 reaches the recess 3, the member 2 is turned, and the key 5 will move through the recess and rest against the end wall thereof, out of alinement with the keyway 6, thus preventing separation of the members until the pin is again turned to aline its key 5 with keyway 6. The key 5 is of a length approximately the same as the width of recess 3, so that it will have practically no longitudinal movement therein and the members 1 and 2 will be held tightly together.

To retain the pin in locked position, a gate 7 is provided to close that portion of the recess between the key 5 and the end of the recess, and this gate has a lug 8 at one end hinged in a pocket in member 1 by a pin 9. A spring-band 10 is secured to the outer face of gate 7, and when the gate is closed this spring-band rests in grooves in key 5 and member 1 and is provided with a hole near its free end to receive a lug or pin 11 on member 1 and lock the gate in closed position.

To separate the members, spring 10 is released from pin or lug 11 and the gate 7 swung out of the recess 3, when the member 2 can be turned to bring key 5 into alinement with keyway 6, and the members may then be pulled apart.

Slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A rod-coupling comprising two members, one of said members having a bore and an open recess communicating with one end thereof, said member also having a keyway communicating with said bore and recess, the other member provided with a pin to enter the bore of the first-mentioned member, a lateral key on said pin to pass through said keyway and enter the open recess, and a hinged gate to enter said recess and confine the key therein, out of alinement with the keyway.

2. A rod-coupling, comprising two members, one member having a longitudinal bore and a keyway in the wall of said bore, a pin on the other member to enter the bore, a key on said pin movable through said keyway, and a hinged gate on the bored member to lock the key out of line with the keyway in the bore of the first-mentioned member.

3. A rod-coupling, comprising two members, one member having a recess therein and a longitudinal bore communicating with the recess, said bore also having a keyway therein, a pin on the other member to enter the bore, a key on the pin to move through the keyway in the other member into the recess and movable in the recess out of alinement with the keyway, a hinged gate in said recess to close the same and hold the key out of alinement with the keyway, and a spring secured to the gate and constructed to lock the gate in closed position.

In testimony whereof I have signed this specification in the presence of two subscribing witnesses.

CHARLIE A. ANDERSON.

Witnesses:
    H. R. JOHNSON,
    CHAS. MARTIN.